(12) United States Patent
Sakai et al.

(10) Patent No.: US 8,993,142 B2
(45) Date of Patent: Mar. 31, 2015

(54) BATTERY PACK FOR ELECTRIC CAR

(71) Applicant: Honda Motor Co., Ltd., Tokyo (JP)

(72) Inventors: Hideaki Sakai, Wako (JP); Kosuke Tachikawa, Wako (JP); Makoto Kawahara, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/363,579

(22) PCT Filed: Dec. 5, 2012

(86) PCT No.: PCT/JP2012/081512
§ 371 (c)(1),
(2) Date: Jun. 6, 2014

(87) PCT Pub. No.: WO2013/084942
PCT Pub. Date: Jun. 13, 2013

(65) Prior Publication Data
US 2014/0322568 A1    Oct. 30, 2014

(30) Foreign Application Priority Data

Dec. 9, 2011 (JP) ................ 2011-269839

(51) Int. Cl.
*H01M 2/10* (2006.01)
*B60R 16/04* (2006.01)
(Continued)

(52) U.S. Cl.
CPC .............. *H01M 2/1083* (2013.01); *B60R 16/04* (2013.01); *Y02T 10/7005* (2013.01);
(Continued)

(58) Field of Classification Search
CPC ... H01M 2/1083; B60R 16/04; B60R 16/033; B60S 5/06

USPC ............................... 180/68.5, 207.3
See application file for complete search history.

(56) References Cited

U.S. PATENT DOCUMENTS

| 2007/0184339 A1* | 8/2007 | Scheucher ................ 429/99 |
| 2008/0090137 A1 | 4/2008 | Buck et al. |
| 2010/0116570 A1 | 5/2010 | Sugawara et al. |

FOREIGN PATENT DOCUMENTS

| CN | 102013465 A | 4/2011 |
| JP | 3050010 B2 | 6/2000 |

(Continued)

OTHER PUBLICATIONS

International Search Report, dated Jan. 15, 2013, issued in corresponding application No. PCT/JP2012/081512.
(Continued)

*Primary Examiner* — Maria J Laios
(74) *Attorney, Agent, or Firm* — Westerman, Hattori, Daniels & Adrian, LLP (57) ABSTRACT

In a battery pack for an electric car, a plurality of battery modules are mounted to be divided between the front and rear of a middle cross member and a main switch and a junction board are disposed in the front and rear of the middle cross member respectively. A bent part of a second high voltage cable, which bends into a U-shape and pass through beneath the middle cross member, is held by a cable holder and fixed to a fixing part. Since only a bus bar disposed in the intermediate part of the first high voltage cable is bent into a U-shape and passed through beneath the middle cross member, not only is a wiring operation of the first high voltage cable easy, but it is also possible to minimize the length of the bus bar to thus enhance the reliability with respect to vibration.

8 Claims, 6 Drawing Sheets

(51) Int. Cl.
*B60L 11/18* (2006.01)
*B60L 1/00* (2006.01)
*H01M 2/20* (2006.01)
*H01M 10/42* (2006.01)
*H01M 2/34* (2006.01)

(52) U.S. Cl.
CPC ........ *B60L 11/1874* (2013.01); *B60L 11/1877* (2013.01); *B60L 11/1879* (2013.01); *B60L 2240/36* (2013.01); *B60L 2240/545* (2013.01); *B60L 2270/145* (2013.01); *B60L 1/003* (2013.01); *B60L 11/1805* (2013.01); *B60L 2270/147* (2013.01); *Y02T 10/705* (2013.01); *H01M 2/206* (2013.01); *H01M 2220/20* (2013.01); *H01M 2/34* (2013.01); *H01M 10/425* (2013.01); *H01M 2010/4271* (2013.01)

USPC .......................... 429/61; 429/100; 180/68.5

(56) References Cited

FOREIGN PATENT DOCUMENTS

| | | |
|---|---|---|
| JP | 2006-253060 A | 9/2006 |
| JP | 2010-507198 A | 3/2010 |
| JP | 2010-113999 A | 5/2010 |
| JP | 2011-006051 A | 1/2011 |
| JP | 2011-171192 A | 9/2011 |

OTHER PUBLICATIONS

Chinese Office Action dated Oct. 27, 2014, issued in corresponding Chinese Patent Application No. 201280059982.0 (5 pages).

* cited by examiner

BATTERY PACK FOR ELECTRIC CAR

TECHNICAL FIELD

The present invention relates to a battery pack for an electric car, the battery pack including a plurality of battery module rows each having a plurality of battery modules disposed in a row extending in the fore-and-aft direction so as to straddle a vehicle body frame extending in a vehicle width direction, the plurality of battery modules being electrically connected in series, the battery modules, of the plurality of battery module rows, that are positioned on one side of the vehicle body frame forming a first battery module group, and the battery modules, of the plurality of battery module rows, that are positioned on the other side of the vehicle body frame forming a second battery module group.

BACKGROUND ART

A battery pack for an electric car in which a plurality of battery housing parts are defined by disposing a lattice-shaped partition frame on an upper face of a plate-shaped battery frame for the electric car, and a plurality of batteries are mounted in each of the battery housing parts, is known from Patent Document 1.

RELATED ART DOCUMENTS

Patent Document

Patent Document 1: Japanese Patent No. 3050010

SUMMARY OF THE INVENTION

Problems to Be Solved By the Invention

A plurality of batteries of a battery pack for an electric car are connected to each other via a cable or a bus bar and are also connected to a main switch or a junction board, but unless the cable, the bus bar, the main switch, the junction board, etc. are appropriately arranged, there are the problems that the battery pack increases in size to thus constrain the capacity of a vehicle compartment and interfere with the vehicle body frame, thus making a wiring operation difficult.

The present invention has been accomplished in light of the above circumstances, and it is an object thereof to efficiently dispose a cable, etc. for connecting a plurality of battery modules mounted on a battery pack and to enhance the ease of mounting of a battery pack onto a vehicle body and the ease of a wiring operation.

Means For Solving the Problems

In order to attain the above object, according to a first aspect of the present invention, there is provided a battery pack for an electric car, the battery pack comprising a plurality of battery module rows each having a plurality of battery modules disposed in a row extending in a fore-and-aft direction so as to straddle a vehicle body frame extending in a vehicle width direction, the plurality of battery modules being electrically connected in series, the battery modules, of the plurality of battery module rows, that are positioned on one side of the vehicle body frame forming a first battery module group, and the battery modules, of the plurality of battery module rows, that are positioned on the other side of the vehicle body frame forming a second battery module group, wherein a main switch is disposed above the first battery module group, the main switch being capable of cutting off electrical connection within the plurality of battery module rows, a junction board is disposed above the second battery module group, the junction board connecting the plurality of battery module rows in parallel to a first high voltage cable, a plurality of second high voltage cables for individually connecting those of the plurality of battery module rows of the first battery module group to those of the corresponding plurality of battery module rows of the second battery module group bend into a U-shape and pass through beneath the vehicle body frame, a bent part of the second high voltage cable being held by a cable holder and fixed to a fixing part, and a bus bar is disposed in an intermediate part of the first high voltage cable, the bus bar bending into a U-shape and passing through beneath the vehicle body frame.

Further, according to a second aspect of the present invention, in addition to the first aspect, the first high voltage cable extending from the junction board passes through the first battery module group and is connected to an output part, and the bus bar disposed in the intermediate part of the first high voltage cable is connected to the first high voltage cable on the output part side via a case of the main switch.

Furthermore, according to a third aspect of the present invention, in addition to the first or second aspect, the main switch comprises a manual switch that is manually opened and closed and can cut off electrical connection within the plurality of battery module rows, and the junction board comprises a contactor that is automatically opened and closed in response to the state of the car and can cut off electrical connection between the plurality of battery module rows and the first high voltage cable.

Moreover, according to a fourth aspect, in addition to any one of the first to third aspects, the first and second high voltage cables are disposed in the fore-and-aft direction in a middle part in the vehicle width direction of the battery pack, and low voltage cables for transmitting a control signal are disposed in the fore-and-aft direction in opposite-side parts in the vehicle width direction of the battery pack and disposed in the vehicle width direction along the vehicle body frame.

A middle cross member 20 of an embodiment corresponds to the vehicle body frame of the present invention, a high voltage connector 71 of the embodiment corresponds to the output part of the present invention, and first to third battery module rows R1 to R3 of the embodiment correspond to the battery module row of the present invention.

Effects of the Invention

In accordance with the first aspect of the present invention, since the main switch is disposed above the first battery module group on one side of the vehicle body frame, which extends in the vehicle width direction, and the junction board is disposed above the second battery module group on the other side of the vehicle body frame, it is possible to maximize vehicle compartment space by dividing the main switch and the junction board between the front and the rear of the vehicle body frame. Furthermore, when the plurality of second high voltage cables connecting the plurality of battery module rows of the first battery module group to the corresponding plurality of battery module rows of the second battery module group are bent into a U-shape and passed through beneath the vehicle body frame, since the bent parts of the second high voltage cables are held by the cable holder and fixed to the fixing part, it is possible to stop by means of the cable holder the second high voltage cable from extending linearly by virtue of its self stiffness, thus not only making a wiring operation of the second high voltage cable easy but also preventing a large load from being imposed on a part connecting the second high voltage cable to the battery module. Moreover, since only the bus bar disposed in the intermediate part of the first high voltage cable is bent into a U-shape and passed through beneath the vehicle body frame, not only is a wiring operation of the first high voltage cable easy, but it is also possible to minimize the length of the bus bar to thus enhance the reliability with respect to vibration.

Furthermore, in accordance with the second aspect of the present invention, the first high voltage cable extending from the junction board passes through the first battery module group and is connected to the output part, and in this arrangement since the bus bar disposed in the intermediate part of the first high voltage cable is connected to the first high voltage cable on the output part side via the case of the main switch, it is possible to eliminate the need for a special connecting part by utilizing the case of the main switch for connecting the bus bar and the first high voltage cable on the output part side.

Moreover, in accordance with the third aspect of the present invention, electrical connection between the battery module rows is cut off as necessary by means of the manual switch of the main switch, which is manually opened and closed, to thus stop the supply of power from the battery pack, and electrical connection between the plurality of battery module rows and the first high voltage cable is cut off automatically by means of the contactor of the junction board, which is automatically opened and closed according to the state of the car, to thus stop the supply of power from the battery pack.

Furthermore, in accordance with the fourth aspect of the present invention, if the first and second high voltage cables were disposed in parallel in the vicinity of the low voltage cable, which transmits a control signal, a high level of noise would be generated in the control signal transmitted through the low voltage cable due to the high voltage current flowing through the first and second high voltage cables, but since in a section where the low voltage cable and the first and second high voltage cables are in parallel the two are spaced so as to be in the middle part and the opposite-side parts in the vehicle width direction, and in the vicinity of the vehicle body frame where the low voltage cable and the first and second high voltage cables are in proximity the two are perpendicular to each other, it is possible to minimize the noise superimposed on the control signal transmitted through the low voltage cable.

EXPLANATION OF REFERENCE NUMERALS AND SYMBOLS

20 Middle cross member (vehicle body frame)
28 Junction board
29 Main switch
31 Battery pack
42 Battery module
64 Manual switch
65 Second high voltage cable
67 Contactor
68 First high voltage cable
71 High voltage connector (output part)
74 Bus bar
76 Low voltage cable
G1 First battery module group
G2 Second battery module group
R1 First battery module row (battery module row)
R2 Second battery module row (battery module row)
R3 Third battery module row (battery module row)

MODES FOR CARRYING OUT THE INVENTION

A mode for carrying out the present invention is explained below by reference to FIG. 1 to FIG. 6.

First Embodiment

Figure 1:
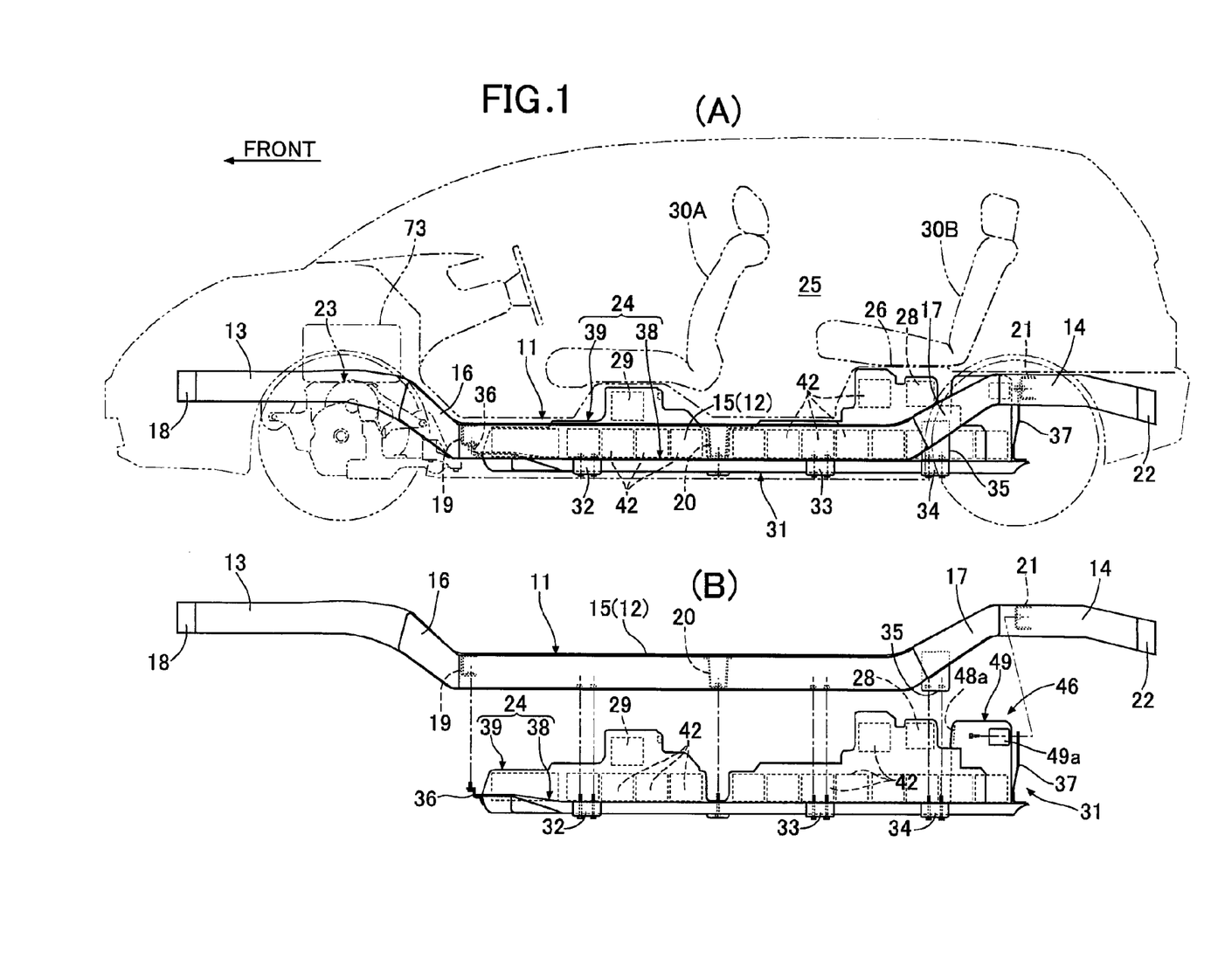
FIG. 1 is a side view of an electric automobile. (first embodiment)

As shown in FIG. 1, a vehicle body frame 11 of an electric automobile includes a pair of left and right floor frames 12 and 12 extending in the vehicle body fore-and-aft direction, a pair of left and right front side frames 13 and 13 extending forwardly from the front ends of the floor frames 12 and 12 while bending upwardly, a pair of left and right rear side frames 14 and 14 extending rearwardly from the rear ends of the floor frames 12 and 12 while bending upwardly, a pair of left and right side sills 15 and 15 disposed outside, in the vehicle width direction, of the floor frames 12 and 12, a pair of left and right front outriggers 16 and 16 connecting the front ends of the side sills 15 and 15 to the front ends of the floor frames 12 and 12, a pair of left and right rear outriggers 17 and 17 connecting the rear ends of the side sills 15 and 15 to the rear ends of the floor frames 12 and 12, a front bumper beam 18 providing a connection between front end parts of the pair of left and right front side frames 13 and 13 in the vehicle width direction, a front cross member 19 providing a connection between front end parts of the pair of left and right floor frames 12 and 12 in the vehicle width direction, a middle cross member 20 providing a connection between intermediate parts, in the fore-and-aft direction, of the pair of left and right floor frames 12 and 12 in the vehicle width direction, a rear cross member 21 providing a connection between intermediate parts, in the fore-and-aft direction, of the pair of left and right rear side frames 14 and 14 in the vehicle width direction, and a rear bumper beam 22 providing a connection between rear end parts of the pair of left and right rear side frames 14 and 14 in the vehicle width direction.

A battery pack 31, which is a power source for a motor/generator 23 that is a drive source for making the electric automobile travel, is supported so as to be suspended from a lower face of the vehicle body frame 11. That is, fixed to a lower face of the battery pack 31 are a front suspension beam 32, middle suspension beam 33, and rear suspension beam 34 extending in the vehicle width direction, fixed to front parts of the pair of left and right floor frames 12 and 12 are opposite ends of the front suspension beam 32, fixed to rear parts of the pair of left and right floor frames 12 and 12 are opposite ends of the middle suspension beam 33, and fixed to the lower ends of support members 35 and 35 hanging down from front parts of the pair of left and right rear side frames 14 and 14 are opposite ends of the rear suspension beam 34. Furthermore, a middle part, in the vehicle width direction, of the front end of the battery pack 31 is supported on the front cross member 19 via a front bracket 36, and a middle part, in the vehicle width direction, of the rear end of the battery pack 31 is supported on the rear cross member 21 via a rear bracket 37. Moreover, the battery pack 31 is supported on a lower face of the middle cross member 20 in an intermediate position between the front suspension beam 32 and the middle suspension beam 33.

In a state in which the battery pack 31 is supported on the vehicle body frame 11, an upper face of the battery pack 31 opposes a lower part of a vehicle compartment 25 via a floor panel 26. That is, the battery pack 31 of the present embodiment is disposed outside the vehicle compartment 25.

Figure 2:
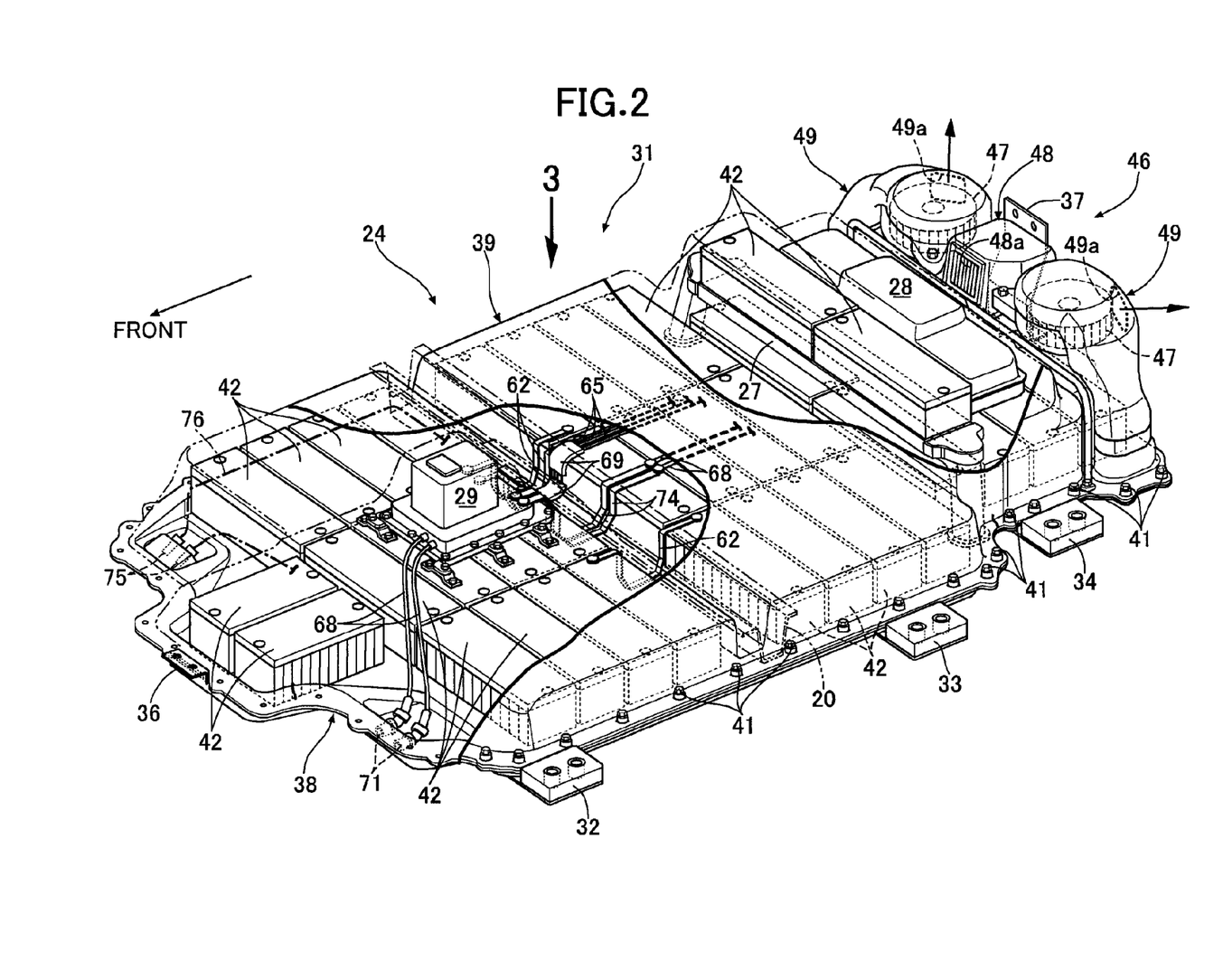
FIG. 2 is a perspective view of a battery pack. (first embodiment)
Figure 3:
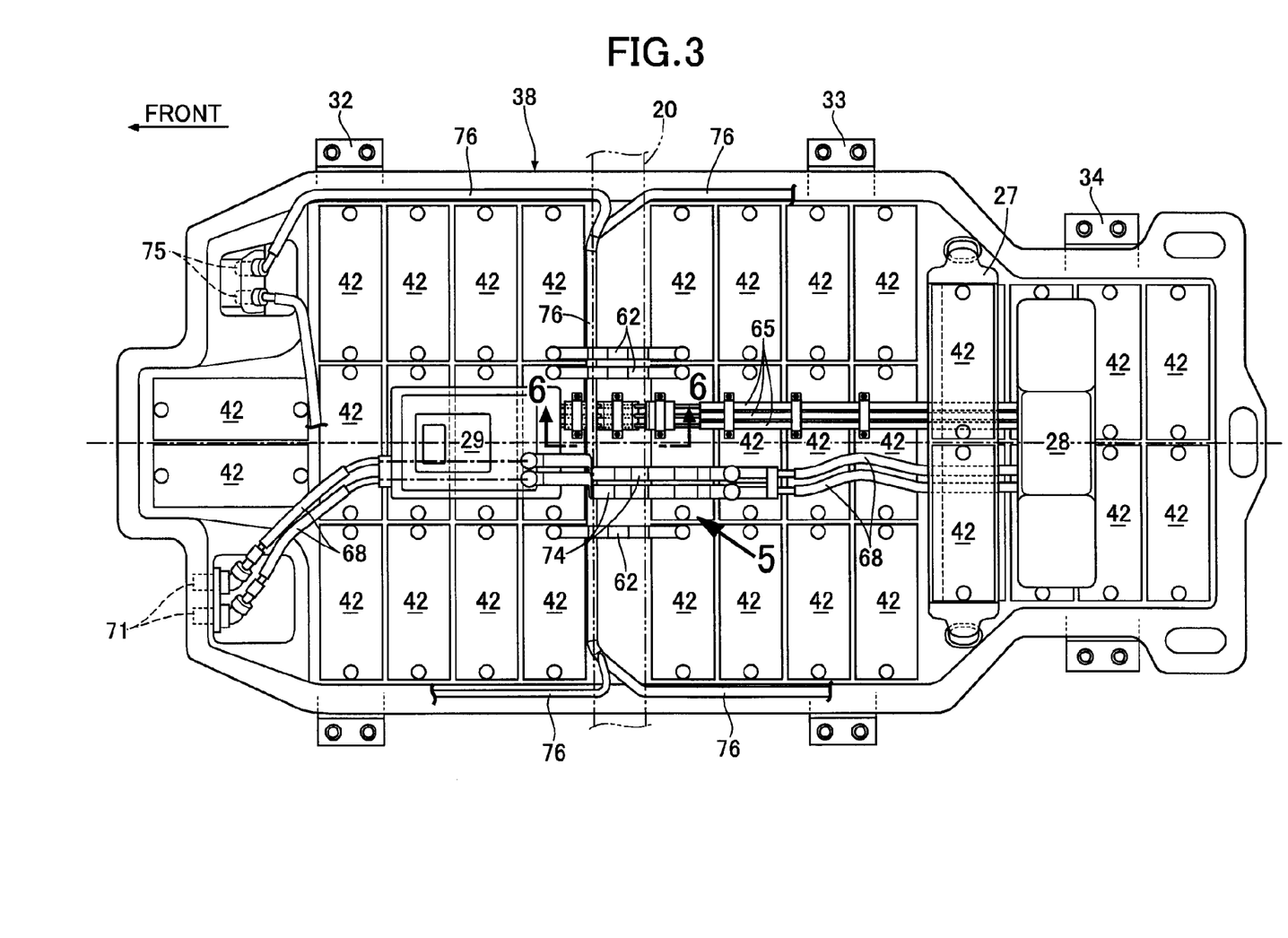
FIG. 3 is a view in the direction of arrow 3 in FIG. 2. (first embodiment)

As shown in FIG. 2 and FIG. 3, the battery pack 31 includes a battery tray 38 made of metal and a battery cover 39, made of a synthetic resin, superimposed on the battery tray 38 from above. A peripheral part of the battery tray 38 and a peripheral part of the battery cover 39 are secured by means of a large number of bolts 41 with a seal member 40 (not illustrated) sandwiched therebetween, the interior of the battery pack 31 being therefore basically hermetically sealed. A plurality of battery modules 42, in which a plurality of battery cells are stacked in series, are mounted on an upper face of the battery tray 38. The battery tray 38 and the battery cover 39 form a battery case 24 of the present invention.

A cooling device 46 provided on a rear part of the battery pack 31 includes a suction duct 48 disposed in a middle part in the vehicle width direction and a pair of left and right discharge ducts 49 and 49 disposed on opposite sides in the vehicle width direction of the suction duct 48. Cooling air sucked in via the suction duct 48 flows through the cooling passage disposed in the interior of the battery tray 38 and is discharged to the outside via the left and right discharge ducts 49 and 49.

A cooling air suction port 48a opens on a front face of an upper part of the suction duct 48 so as to face forward, the cooling air suction port 48a sucking air outside the battery pack 31 into the interior of the suction duct 48 as cooling air. Electric cooling fans 47 and 47 are housed in the interiors of the respective discharge ducts 49 and 49, and cooling air discharge ports 49a and 49a are formed so as to face the outer peripheries of the respective cooling fans 47 and 47, the cooling air discharge ports 49a and 49a discharging cooling air that has been subjected to heat exchange. The left and right cooling air discharge ports 49a and 49a open rearwardly and outwardly in the vehicle width direction.

Therefore, when the cooling fans 47 and 47 are driven, cooling air sucked in via the cooling air suction port 48a of the suction duct 48 is supplied to the interior of the battery tray 38, carries out heat exchange with the battery modules 42 while flowing through the cooling passage in the interior of the battery tray 38, then passes through the cooling fans 47 and 47 of the discharge ducts 49 and 49, and is discharged via the cooling air discharge ports 49a and 49a.

Figure 4:
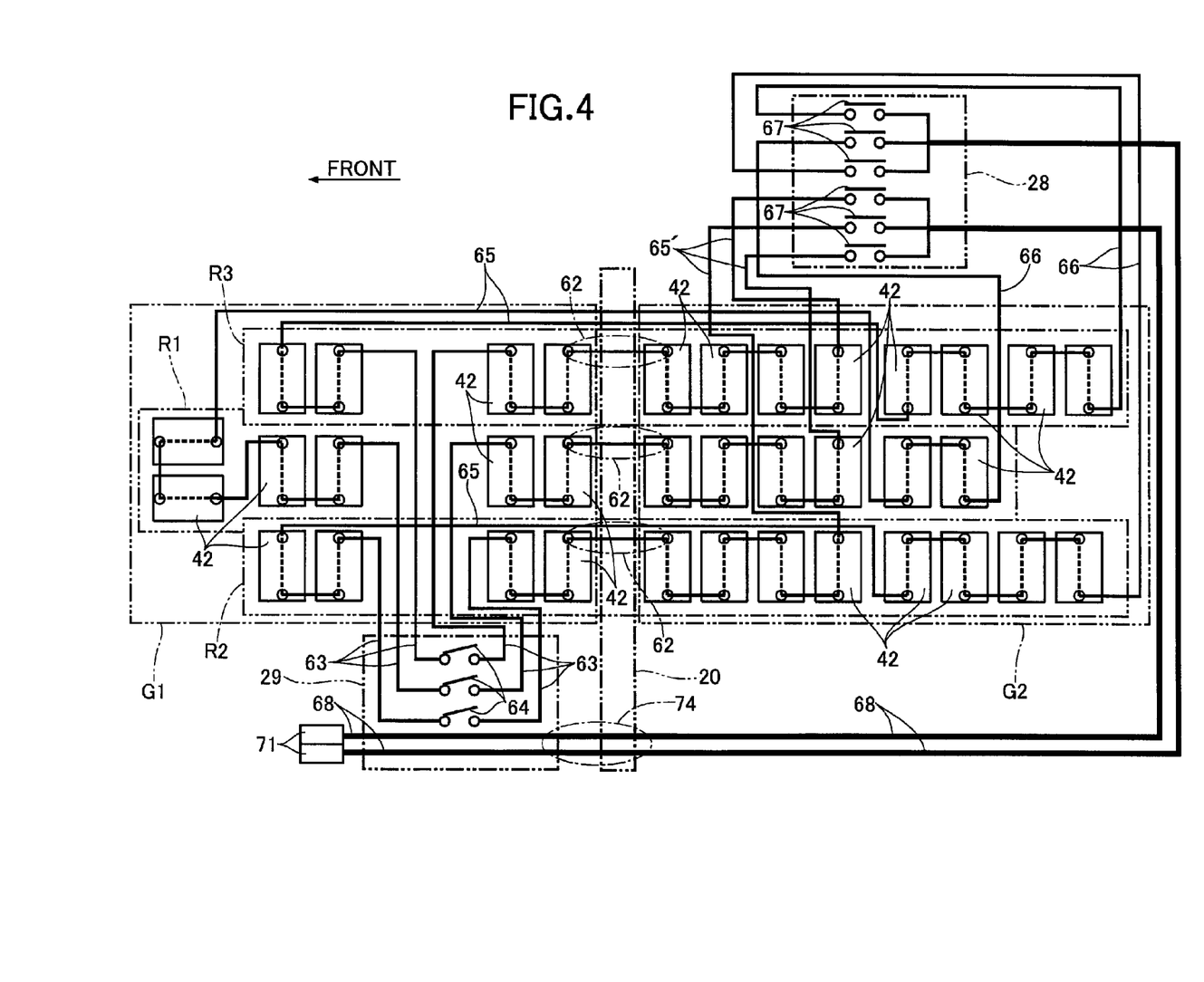
FIG. 4 is an electrical circuit diagram of the battery pack. (first embodiment)

As shown in FIG. 3 and FIG. 4, the battery modules 42 mounted on the battery tray 38 are formed from a first battery module row R1 including twelve battery modules 42 disposed in the fore-and-aft direction in a middle part in the vehicle width direction, a second battery module row R2 including twelve battery modules 42 disposed in the fore-and-aft direction on the left-hand side in the vehicle width direction, and a third battery module row R3 including twelve battery modules 42 disposed in the fore-and-aft direction on the right-hand side in the vehicle width direction. Two battery modules 42 in a front part of the first battery module row R1 project further forward than the front ends of the second and third battery module rows R2 and R3, and two battery modules 42 in a rear part of the first battery module row R1 are placed on an upper face of a battery support member 27 disposed at a position that is stepped higher than the battery tray 38 (see FIG. 2 and FIG. 3).

A total of 36 battery modules 42 of the first to third battery module rows R1 to R3 are divided between the front and the rear with respect to the middle cross member 20, which extends in the vehicle width direction; fourteen battery modules 42 on the front side of the middle cross member 20 form a first battery module group G1, and twenty-two battery modules 42 on the rear side of the middle cross member 20 form a second battery module group G2. A main switch 29 (see FIG. 2 and FIG. 3) is disposed above the first battery module group G1, and a junction board 28 (see FIG. 2 and FIG. 3) is disposed above the second battery module group G2.

Twelve of the battery modules 42 of each of the first to third battery module rows R1 to R3 are basically connected in series by means of bus bars 61 (see FIG. 5), but only three bus bars 62 straddling the underneath of the middle cross member 20 (see FIG. 3 to FIG. 5), that is, three bus bars 62 connecting the battery modules 42 of the first battery module group G1 and the battery modules 42 of the second battery module group G2, are curved into a U-shape and pass through beneath the middle cross member 20.

Furthermore, two bus bars 63 are led out from intermediate parts of the battery modules 42 of each of the first to third battery module rows R1 to R3 in the first battery module group G1 and are connected to three manual switches 64 of the main switch 29. Therefore, when the three manual switches 64 of the main switch 29 are manually opened, electrical connection of the twelve battery modules 42 of the first to third battery module rows R1 to R3 can be cut off en route, thus turning the power of the battery pack 31 OFF.

Three second high voltage cables 65 led out from end parts of the battery modules 42 of the first to third battery module rows R1 to R3 in the first battery module group G1 (see FIG. 3 to FIG. 5) are bundled together and pass through from the front to the rear beneath the middle cross member 20, and are then each connected to the battery modules 42 of the corresponding first to third battery module rows R1 to R3 of the second battery module group G2. Moreover, three second high voltage cables 65' led out from end parts of the battery modules 42 of the first to third battery module rows R1 to R3 in the second battery module group G2 (see FIG. 4) are led into the interior of the junction board 28. Furthermore, three second high voltage cables 66 led out from end parts of the battery modules 42 of the first to third battery module rows R1 to R3 in the second battery module group G2 (see FIG. 4) are bundled together and led into the interior of the junction board 28. The junction board 28 includes six contactors 67 and connects the total of six second high voltage cables 65', 66 to two first high voltage cables 68 and 68 (see FIG. 3 to FIG. 5).

That is, the power from the battery modules 42 of the first to third battery module rows R1 to R3 disposed side by side is combined in the junction board 28 and outputted to the two first high voltage cables 68 and 68. In this arrangement, the six contactors 67 are controlled so as to automatically open and close according to the running conditions of the car or the state of the battery modules 42, thus enabling the power of any of the battery modules 42 of the first to third battery module rows R1 to R3 to be cut off.

The three second high voltage cables 65 led out from the end parts of the battery modules 42 of the first to third battery module rows R1 to R3 in the first battery module group G1 pass through from the front to the rear beneath the main switch 29 in a middle part in the vehicle width direction of the battery pack 31 and then pass through from the front to the rear beneath the middle cross member 20. In this section, the three second high voltage cables 65 are made into a flattened bundle by means of cable holders 69 and bent into a predetermined shape at the same time, and fixed to the battery modules 42 and the battery tray 38 by means of fixing members 70 (see FIG. 5 and FIG. 6).

The two first high voltage cables 68 and 68 coming out from the junction board 28 extend forwardly in the middle part in the vehicle width direction of the battery pack 31 and pass through beneath the middle cross member 20 and further pass through the interior of the main switch 29 without interference, are then connected to a high voltage connector 71 provided on a front left part of the battery tray 38 (see FIG. 3), and are connected, via another cable 72 (see FIG. 1), from there to a power control unit 73 provided in an upper part of the motor/generator 23 (see FIG. 1) in a front part of the vehicle body.

Figure 5:
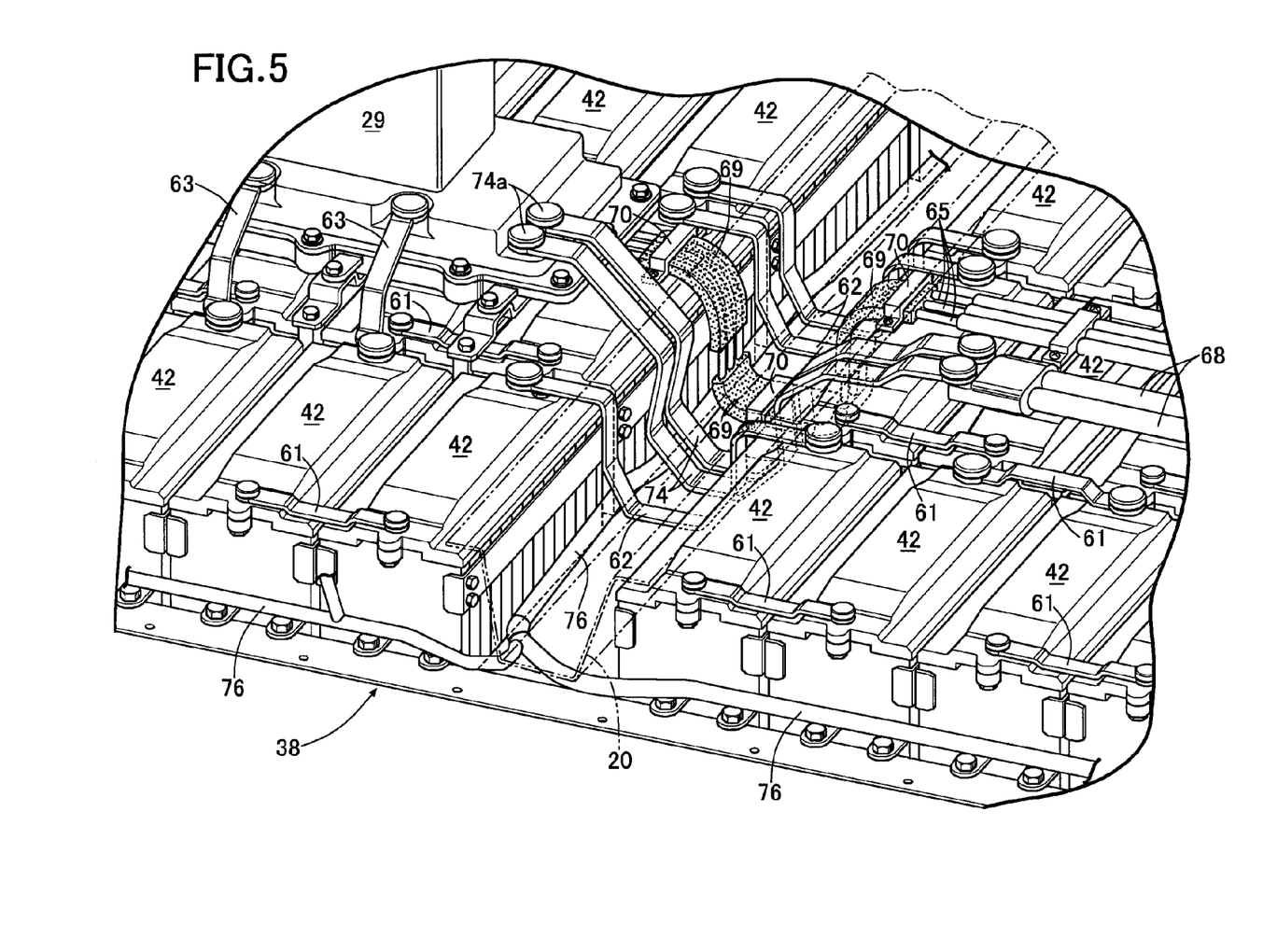
FIG. 5 is a view in the direction of arrow 5 in FIG. 3. (first embodiment)
Figure 6:
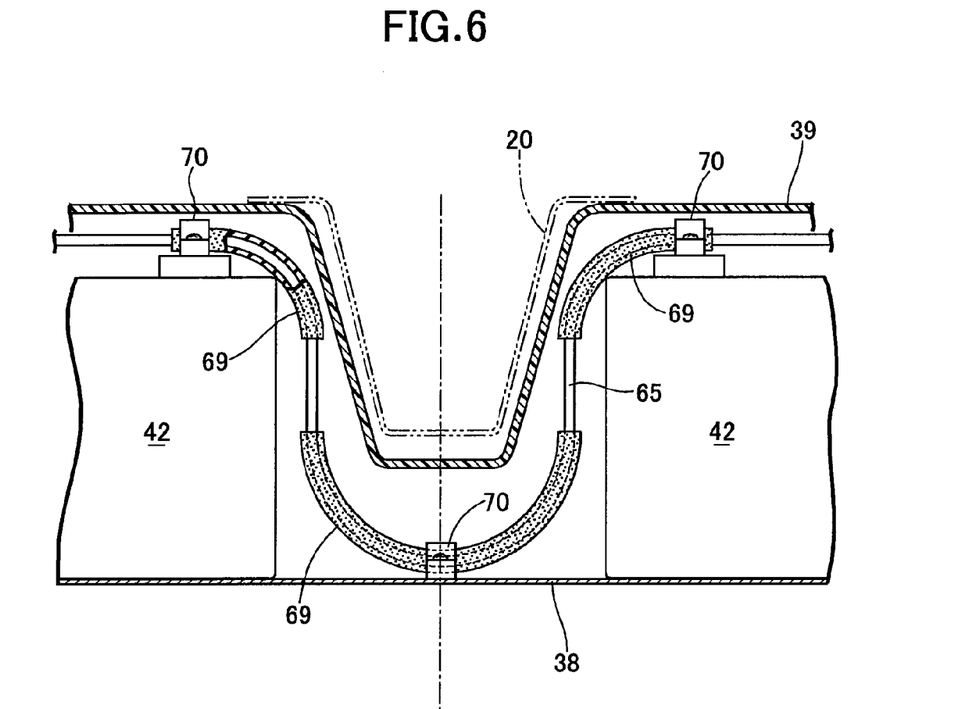
FIG. 6 is a sectional view along line 6-6 in FIG. 3. (first embodiment)

Portions where the two first high voltage cables 68 and 68 pass through beneath the middle cross member 20 are replaced with two bus bars 74 and 74 bent into a U-shape (see FIG. 4 and FIG. 5). The bus bars 74 and 74 passing through beneath the middle cross member 20 pass through the interior of the main switch 29 without interference, then turn into the two first high voltage cables 68 and 68 again, and are connected to the high voltage connector 71. In this arrangement, it is necessary to use connecting portions 74a and 74a (see FIG. 5) for connecting the bus bars 74 and 74 and the first high voltage cables 68 and 68 on the high voltage connector 71 side, but since the connecting portions 74a and 74a are provided by utilizing the case of the main switch 29, it is unnecessary to use a special connecting portion.

Low voltage cables 76 extending from a low voltage connector 75 provided in a front right part of the battery tray 38 (see FIG. 3) are basically disposed in the fore-and-aft direction in opposite-side parts in the vehicle width direction of the battery pack 31 and are also disposed in the vehicle width direction along the middle cross member 20, and are connected to a temperature sensor (not illustrated) provided on the junction board 28 or on each of the battery modules 42.

As described above, since the main switch 29 is disposed on the upper face of the central part of the first battery module group G1, it is possible to avoid any constraint of a vehicle compartment space by utilizing a space sandwiched between the left and right front seats 30A (see FIG. 1) for housing the main switch 29 and, furthermore, since the junction board 28 is disposed on the upper face of the second battery module group G2, it is possible to avoid constraint of the vehicle compartment space by utilizing a space beneath the rear seat 30B (see FIG. 1) for housing the junction board 28. Moreover, since the main switch 29 and the junction board 28 are disposed so as to be divided between the front and rear of the vehicle body, it is possible to maximize the vehicle compartment space.

Furthermore, the three second high voltage cables 65 connecting the first to third battery module rows R1 to R3 of the first battery module group G1 to the corresponding first to third pluralities of battery module rows R1 to R3 of the second battery module group G2 are bent into a U-shape and pass through beneath the middle cross member 20, and in this arrangement since the bent parts of the second high voltage cables 65 are held by the three cable holders 69 and fixed to the battery modules 42 and the battery tray 38 by means of the fixing members 70, it is possible for the cable holders 69 to stop the second high voltage cables 65 from extending linearly by virtue of their self stiffness, thus not only making a wiring operation of the second high voltage cables 65 easy but also preventing a large load from being imposed on a part connecting the second high voltage cables 65 to terminals of the battery modules 42.

Furthermore, although it is difficult to bend the first high voltage cables 68 and 68, which have a large diameter, in order to pass them through beneath the middle cross member 20, since the bus bars 74 and 74 are disposed in the intermediate parts of the first high voltage cables 68 and 68, and only the bus bars 74 and 74 are bent into a U-shape and passed through beneath the middle cross member 20, a wiring operation of the first high voltage cables 68 and 68 is easy and, moreover, the length of the bus bars 74 and 74 can be minimized, thus enhancing the reliability with respect to vibration.

If the first and second high voltage cables 68, 68, 65, 65' and 66 were disposed in parallel in the vicinity of the low voltage cables 76, which transmit a control signal, a high level of noise would be generated in the control signal transmitted through the low voltage cables 76 due to the high voltage current flowing through the first and second high voltage cables 68, 68, 65, 65' and 66. However, in accordance with the present embodiment, since the low voltage cables 76 extending in parallel to the first and second high voltage cables 68, 68, 65, 65' and 66 disposed in the fore-and-aft direction in the intermediate part in the vehicle width direction of the battery pack 31 are disposed in the fore-and-aft direction in opposite-side parts in the vehicle width direction of the battery pack 31, it is possible to ensure a large distance between the first and second high voltage cables 68, 68, 65, 65' and 66 and the low voltage cables 76, thus reducing the noise.

Furthermore, in a portion where the low voltage cable 76 is disposed in the vehicle width direction along the middle cross member 20, the low voltage cable 76 is in proximity to the first and second high voltage cables 68, 68, 65, 65' and 66, but due to the low voltage cable 76 being perpendicular to the first and second high voltage cables 68, 68, 65, 65' and 66 in the proximity portion, the low voltage cable 76 is less susceptible to the magnetic influence of the first and second high voltage cables 68, 68, 65, 65' and 66, thus reducing the noise.

An embodiment of the present invention is explained above, but the present invention may be modified in a variety of ways as long as the modifications do not depart from the spirit and scope thereof.

For example, in the embodiment the battery pack 31 includes the first to third battery module rows R1 to R3, but the number of battery module rows is not limited to three.

The invention claimed is:

1. A battery pack for an electric car, the battery pack comprising a plurality of battery module rows each having a plurality of battery modules disposed in a row extending in a fore-and-aft direction so as to straddle a vehicle body frame extending in a vehicle width direction, the plurality of battery modules being electrically connected in series, the battery modules, of the plurality of battery module rows, that are positioned on one side of front and rear sides of the vehicle body frame forming a first battery module group, and the battery modules, of the plurality of battery module rows, that are positioned on the other side of the front and rear sides of the vehicle body frame forming a second battery module group, wherein a main switch is disposed above the first battery module group, the main switch being capable of cutting off electrical connection within the plurality of battery module rows, a junction board is disposed above the second battery module group, the junction board connecting the plurality of battery module rows in parallel to a first high voltage cable, a plurality of second high voltage cables for individually connecting those of the plurality of battery module rows of the first battery module group to those of the corresponding plurality of battery module rows of the second battery module group bend into a U-shape and pass through beneath the vehicle body frame, a bent part of the second high voltage cable being held by a cable holder and fixed to a fixing part, and a bus bar is disposed in an intermediate part of the first high voltage cable, the bus bar bending into a U-shape and passing through beneath the vehicle body frame.

2. The battery pack for an electric car according to claim 1, wherein the first high voltage cable extending from the junction board passes through the first battery module group and is connected to an output part, and the bus bar disposed in the intermediate part of the first high voltage cable is connected to the first high voltage cable on the output part side via a case of the main switch.

3. The battery pack for an electric car according to claim 1, wherein the main switch comprises a manual switch that is manually opened and closed and can cut off electrical connection within the plurality of battery module rows, and the junction board comprises a contactor that is automatically opened and closed in response to the state of the car and can cut off electrical connection between the plurality of battery module rows and the first high voltage cable.

4. The battery pack for an electric car according to claim 1, wherein the first and second high voltage cables are disposed in the fore-and-aft direction in a middle part in the vehicle width direction of the battery pack, and low voltage cables for transmitting a control signal are disposed in the fore-and-aft direction in opposite-side parts in the vehicle width direction of the battery pack and disposed in the vehicle width direction along the vehicle body frame.

5. The battery pack for an electric car according to claim 2, wherein the first and second high voltage cables are disposed in the fore-and-aft direction in a middle part in the vehicle width direction of the battery pack, and low voltage cables for transmitting a control signal are disposed in the fore-and-aft direction in opposite-side parts in the vehicle width direction of the battery pack and disposed in the vehicle width direction along the vehicle body frame.

6. The battery pack for an electric car according to claim 3, wherein the first and second high voltage cables are disposed in the fore-and-aft direction in a middle part in the vehicle width direction of the battery pack, and low voltage cables for transmitting a control signal are disposed in the fore-and-aft direction in opposite-side parts in the vehicle width direction of the battery pack and disposed in the vehicle width direction along the vehicle body frame.

7. The battery pack for an electric car according to claim 2, wherein the main switch comprises a manual switch that is manually opened and closed and can cut off electrical connection within the plurality of battery module rows, and the junction board comprises a contactor that is automatically opened and closed in response to the state of the car and can cut off electrical connection between the plurality of battery module rows and the first high voltage cable.

8. The battery pack for an electric car according to claim 7, wherein the first and second high voltage cables are disposed in the fore-and-aft direction in a middle part in the vehicle width direction of the battery pack, and low voltage cables for transmitting a control signal are disposed in the fore-and-aft direction in opposite-side parts in the vehicle width direction of the battery pack and disposed in the vehicle width direction along the vehicle body frame.

\* \* \* \* \*